United States Patent
Roy et al.

(10) Patent No.: US 12,442,946 B2
(45) Date of Patent: Oct. 14, 2025

(54) SEISMIC NAVIGATION DATA QUALITY ANALYSIS

(71) Applicant: Landmark Graphics Corporation, Houston, TX (US)

(72) Inventors: Samiran Roy, Bangalore (IN); Shreshth Srivastav, Bangalore (IN); Bhaskar Mandapaka, Bangalore (IN); Satyam Priyadarshy, Houston, TX (US)

(73) Assignee: Landmark Graphics Corporation, Inc., Houston, TX (US)

(*) Notice: Subject to any disclaimer, the term of this patent is extended or adjusted under 35 U.S.C. 154(b) by 427 days.

(21) Appl. No.: 17/553,091

(22) Filed: Dec. 16, 2021

(65) Prior Publication Data
US 2023/0194738 A1   Jun. 22, 2023

(51) Int. Cl.
*G01V 1/30* (2006.01)
*E21B 49/00* (2006.01)
*G06N 20/00* (2019.01)

(52) U.S. Cl.
CPC ............ *G01V 1/30* (2013.01); *E21B 49/00* (2013.01); *G06N 20/00* (2019.01); *E21B 2200/20* (2020.05); *E21B 2200/22* (2020.05); *G01V 2210/61* (2013.01)

(58) Field of Classification Search
CPC ...... G01V 1/30; G01V 1/282; G01V 2210/61; G06N 20/00; E21B 49/00; E21B 2200/20; E21B 2200/22; E21B 2200/61
USPC .......................................................... 702/2
See application file for complete search history.

(56) References Cited

U.S. PATENT DOCUMENTS

| | | | |
|---|---|---|---|
| 5,920,828 A | 7/1999 | Norris et al. | |
| 10,976,458 B2* | 4/2021 | Nguyen | G01V 1/307 |
| 2014/0165694 A1 | 6/2014 | Bousquie et al. | |
| 2015/0316684 A1* | 11/2015 | Schirmer | G06F 17/18 |
| | | | 703/2 |
| 2018/0106917 A1* | 4/2018 | Osypov | G01V 1/003 |
| 2020/0183032 A1 | 6/2020 | Liu et al. | |
| 2020/0301036 A1* | 9/2020 | Ramfjord | E21B 7/04 |

(Continued)

FOREIGN PATENT DOCUMENTS

| | | |
|---|---|---|
| EP | 1735641 A1 | 12/2006 |
| EP | 1735641 B1 | 2/2011 |

(Continued)

OTHER PUBLICATIONS

English translation of RU 110508, Nov. 20, 2011. (Year: 2011).*

*Primary Examiner* — Michael P Nghiem
(74) *Attorney, Agent, or Firm* — Michael Jenney; Parker Justiss, P.C.

(57) ABSTRACT

Processes can be employed to select cartographic reference system (CRS) recommendations from a CRS model where the CRS recommendations are matched to received seismic data. A learning mode can be used to build the CRS model where seismic data is matched to CRS. The learning mode can be automated using natural language processing system to parse the meta data for the seismic data, such as the name, area, or code, or label. The CRS model can be updated using an output from a user system, such as when a user manually matches a CRS to seismic data. The matched seismic data to CRS can be used as input to a user system or a computing system, such as a borehole operation system.

20 Claims, 3 Drawing Sheets

(56) References Cited

U.S. PATENT DOCUMENTS

2021/0034948 A1* 2/2021 Souza .............. G06F 16/24573
2021/0049155 A1 2/2021 Markovic et al.
2022/0099855 A1* 3/2022 Li ........................ G01V 1/345
2023/0376086 A1* 11/2023 Brockman .......... G07F 17/3209

FOREIGN PATENT DOCUMENTS

| RU | 110508 U1 * | 11/2011 | | |
|---|---|---|---|---|
| WO | 2018071632 A1 | 4/2018 | | |
| WO | WO-2020048770 A1 * | 3/2020 | ............. | G01C 21/30 |
| WO | 2020146863 A1 | 7/2020 | | |
| WO | WO-2023113814 A1 * | 6/2023 | ............. | E21B 49/00 |

* cited by examiner

SEISMIC NAVIGATION DATA QUALITY ANALYSIS

TECHNICAL FIELD

This application is directed, in general, to analyzing seismic data and, more specifically, to matching seismic data to cartographic reference systems.

BACKGROUND

In evaluating a location for a potential reservoir field or a potential placement of a borehole, seismic data for the area can be evaluated in conjunction with a cartographic reference system (CRS). Determining the appropriate CRS to utilize with the seismic data can be difficult, such as being difficult for the legacy data or difficult at the stage of storing that data in a data repository. Meta data information for the seismic data may utilize different keys or codes for the labels. These issues can increase when the seismic data is sourced from different sources, such as from more than one government agency or more than one country. Being able to improve the seismic data to CRS matching would be beneficial and reduce issues during later analysis phases, such as a seismic interpretation workflow.

SUMMARY

In one aspect, a method to train a machine learning system to associate seismic data with cartographic reference systems (CRSs) is disclosed. In one embodiment, the method includes (1) receiving seismic data relating to a location of interest, (2) parsing meta data of the seismic data to determine a name, an area, or a code, (3) associating the seismic data with one or more CRSs, using the meta data, to generate a seismic data-CRS match, and (4) updating a CRS model of the machine learning system with the seismic data-CRS match, wherein the seismic data-CRS match is utilized to determine a first location of a reservoir field or a second location of a borehole for hydrocarbon production.

In a second aspect, a method of using a machine learning system for matching seismic data to CRSs is disclosed. In one embodiment, the method includes (1) receiving seismic data relating to a location of interest, (2) parsing meta data of the seismic data to determine a name, an area, or a code, and (3) utilizing a CRS model to associate the seismic data with one or more CRS, utilizing the meta data, to generate a seismic data-CRS match, wherein the seismic data-CRS match is utilized to determine a first location of a reservoir field or a second location of a borehole for hydrocarbon production.

In a third aspect, a system is disclosed. In one embodiment, the system includes (1) a data transceiver, capable of receiving seismic data, wherein the seismic data relates to a location of interest for a reservoir field or a borehole, (2) a machine learning system, capable of parsing meta data of the seismic data to generate a label, associating, using the label, seismic data to a CRS to generate a seismic data-CRS match, and updating a CRS model using the seismic data-CRS match, and (3) a seismic data analyzer, capable of communicating with the data transceiver and the machine learning system, and using the CRS model to select one or more CRS recommendations for the seismic data.

BRIEF DESCRIPTION

Reference is now made to the following descriptions taken in conjunction with the accompanying drawings, in which.

DETAILED DESCRIPTION

When determining an appropriate reservoir or identifying a location to place a borehole for hydrocarbon production, seismic data can be utilized in conjunction with geo-referencing parameters or other mapping or geological data to provide data and analysis of the locations being considered. The resulting analysis can be used by systems or users to determine specific locations of interest for the reservoir or for well placement. The seismic data can be sourced or retrieved from national data repositories or from corporate data storages, which itself can be a collection of seismic data from one or more government agencies or one or more corporations.

Matching the seismic data to a cartographic reference system (CRS) can be problematic. Seismic data with incorrect geo-referencing parameters or CRS information can cause data issues. In some aspects, the incorrect matching may not be detected until later in the process, such as by users. The seismic data may not address this issue, where a visual inspection may be needed to perform a qualitative analysis of the seismic navigation information extracted from the seismic data or the seismic navigation information may be identified from the navigation file.

Geographic information system (GIS) display systems for CRS systems can be practical for a small amount of data quality inspections. For larger data sets, it can take a significant amount of user effort to perform the data quality inspection. This can allow user mistakes during the data entry for CRS selection or for the definition for corporate-level seismic data storage. The user effort or user mistakes can cause an increase in cost on the overall exploration and production of hydrocarbon reservoirs, since locating a well at a desired location can be key for exploration activities.

Geophysical interpretation software currently available does not provide insight into the seismic navigation data matching its correct CRS information. Some systems do not provide automated detection of the CRS information of seismic data. Some systems do not perform the automated CRS selection. Incorrect CRS data can lead to serious spatial mismatch issues in exploration and could result in a wrongly placed borehole in the reservoir field.

This disclosure presents a data-driven solution for seismic data quality analysis for the detection of CRS and navigation-related issues and errors using machine learning techniques. The processes can learn the probable CRS systems for a given seismic data input, for example, using a file name or a label. The processes can output one or more CRS systems. In some aspects, the processes can indicate a primary CRS system. In some aspects, the processes can provide a rank or weight for each of the identified CRS systems. If more than one potential CRS system is identified, or if the identified CRS is different from the mentioned CRS in the meta data, the process can indicate that a user review can be used to select the CRS used to match with the seismic data.

As users provide the indication of the CRS to match with the seismic data, a feedback process can be used to improve the machine learning processes. In some aspects, a statistical infographic can be used by the user to interpret the seismic data navigation parameters without loading the navigation data thereby reducing computing time and resources. The user can visualize the seismic data using, for example, a GIS system. In some aspects, the processes can provide the result, e.g., a CRS recommendation, automatically to the appropriate systems. The processes can utilize the machine learning output or, in some aspects, use a statistics-based CRS recommendation in conjunction with the machine learning output. In some aspects, the processes can provide the results for a user to review.

Figure 1:
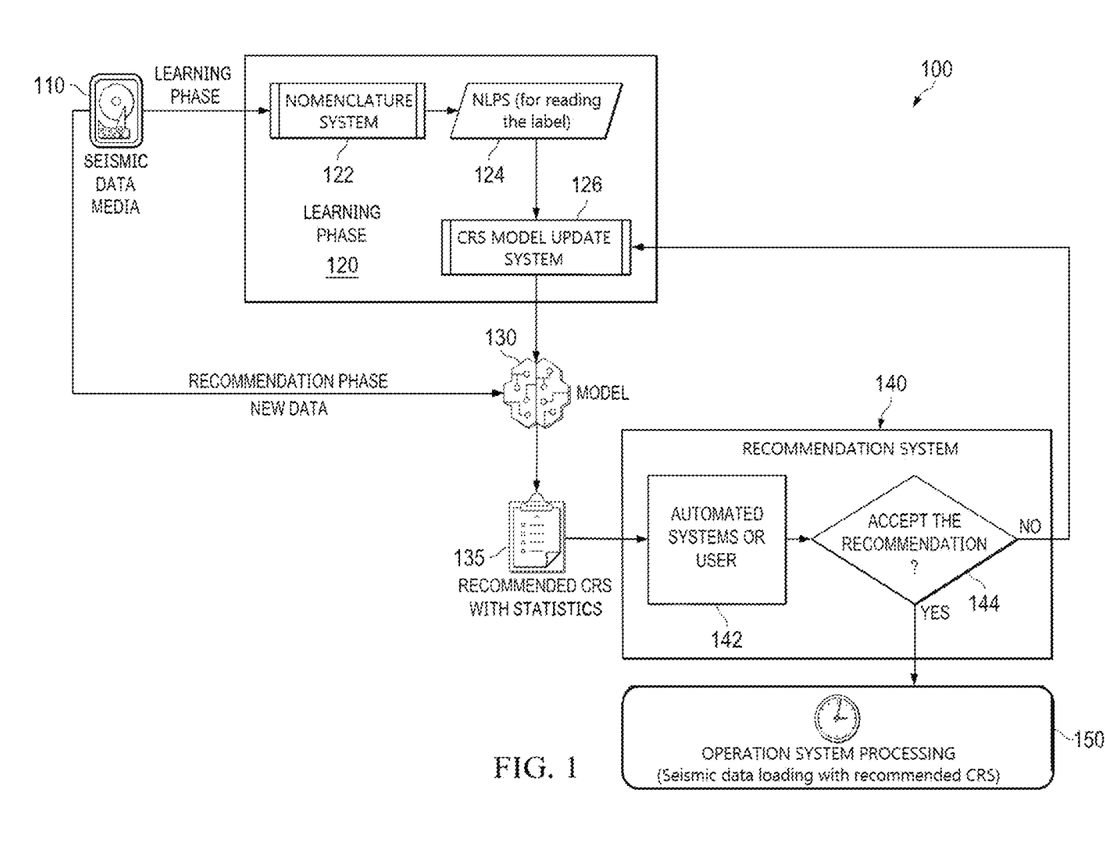
FIG. 1 is an illustration of a diagram of an example seismic navigation data quality system.

Turning now to the figures, FIG. 1 is an illustration of a diagram of an example seismic navigation data quality system 100, which demonstrates two components, a learning phase for the CRS model and a recommendation phase using the CRS model. In some aspects, the CRS model can be stored in a machine learning system. In some aspects, the CRS model can be stored in a computing system.

Seismic data typically is received on tape media or a digital storage media. In some aspects, the seismic data can be received electronically, for example, through a file transfer protocol, an internet download, or another electronic system. The meta data associated with the seismic data, such as a label, can include a name, an area, or a code for the seismic data. For example, a seismic data media containing data from the Gulf of Mexico (GOM) with a particular block may contain the label, e.g., meta data, with the GOM phrase. During the learning phase, the machine learning system can associate one or more specific CRS, for example, UTM 14N, using the meta data of the seismic data. A CRS model can be generated or updated using the learnings.

During a recommendation process, media with meta data indicating GOM can be automatically matched with the UTM 14N CRS system. If numerous CRS are associated with the meta data of the seismic data, then statistical information can be used, such as ranking, weighting, or other statistical algorithms, for example, a 60% match with UTM 14N and a 30% match with NAD 27. The multiple CRS recommendations can be combined into a seismic data-CRS match parameter. In some aspects, the system can show the CRS on a map for visual validation and acceptance by a user.

Seismic navigation data quality system 100 includes a seismic data media 110. Seismic data media 110 can be received from a national data repository, from a corporation, or other source. Seismic data media 110 can be a physical media or it can be received electronically, such as one or more digital files. Digital files can be received through a cloud environment, through the internet, through an intranet, or another means for supporting digital file transfers. During a learning phase, a machine learning system 120 can receive seismic data media 110. Machine learning system 120 can utilize a nomenclature system 122 to determine the meta data for seismic data media 110. The nomenclature can be a label, name, area, or code for the seismic data contained within seismic data media 110.

A natural language processing system 124 can receive the meta data and parse the meta data for appropriate location information. A CRS model update system 126 can use the parsed meta data to associate one or more CRS with the seismic data on seismic data media 110. The CRS model can be used by the recommendation system.

During a recommendation phase, meta data associated with the seismic data on seismic data media 110 can be processed through CRS model 130. CRS model 130 can specify one or more CRS for the seismic data. Recommendation process 135 can generate a seismic data-CRS match that includes the one or more CRS and ranks, weights, or other statistical algorithms of the CRS that may be available. The seismic data-CRS match can be communicated to a recommendation system 140. In some aspects, recommendation system 140 can be a computing system, such as a borehole operation system or a reservoir operation system. In some aspects, recommendation system 140 can be a user system.

The seismic data-CRS match can be received by processing system 142 and the seismic data-CRS match can be determined as an acceptable match or not at a decision 144. If recommendation system 140 is a computing system and the match is found not acceptable, then a user would need determine an appropriate match. If a user system is processing the seismic data-CRS match, then a user can determine the appropriate matches of seismic data to CRS. The CRS model can be updated from the output of recommendation system 140. Accepted matches can be utilized by other systems or process at processing 150, such as one or more borehole operation systems or reservoir operation systems, where the operation system can use the results for a seismic interpretation workflow.

Figure 2:
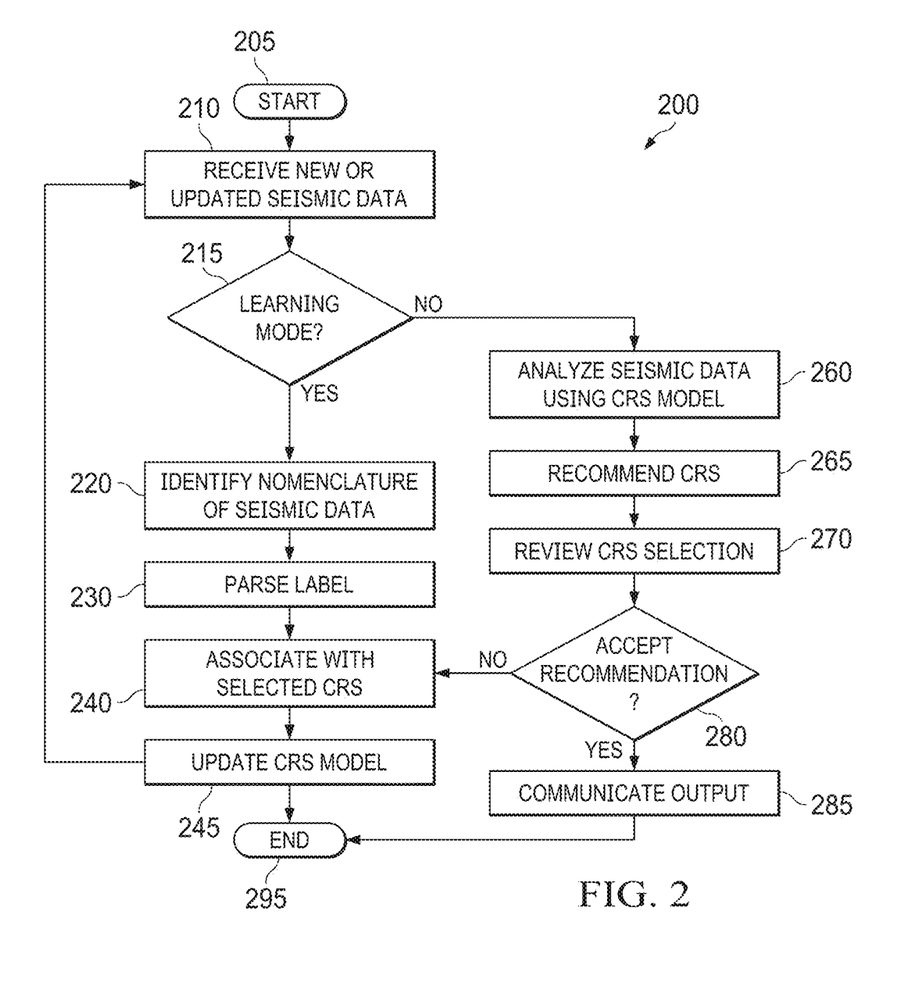
FIG. 2 is an illustration of a flow diagram of an example method to analyze seismic data meta data.

FIG. 2 is an illustration of a flow diagram of an example method 200 to analyze seismic data meta data. Method 200 can be performed, for example, by users performing analysis operations. Method 200 can be performed on a computing system, for example, seismic data analyzer system 300 of FIG. 3 or seismic data analyzer controller 400 of FIG. 4. The computing system can be a reservoir controller, a data center, a cloud environment, a server, a laptop, a mobile device, or other computing system capable of receiving the seismic data, input parameters, and capable of communicating with other computing systems. Method 200 can be encapsulated in software code or in hardware, for example, an application, code library, dynamic link library, module, function, RAM, ROM, and other software and hardware implementations. The software can be stored in a file, database, or other computing system storage mechanism. Method 200 can be partially implemented in software and partially in hardware. Method 200 can perform the steps for the described processes, for example, the learning phase and the recommendation phase.

Method 200 starts at a step 205 and proceeds to a step 210. In step 210, new or updated seismic data can be received. The seismic data can be received physically, such as on a physical media, or received digitally, such as through a file transfer, internet protocol, intranet transfer, or other digital transfer process whether wired or wireless. The seismic data can have a physical label, such as attached to the physical media, or a digital label as part of the seismic data. The label is used as the meta data for the seismic data. The label can include a name, an area, a code, other information, or a combination thereof about the seismic data.

Proceeding to a decision step 215, if a learning mode process is being used, then method 200 proceeds to a step 220. If a recommendation mode process is being used, then method 200 proceeds to a step 260. In step 220, nomenclature of the seismic data can be identified. The nomenclature can determine whether the label includes a name, an area, a code, or other types of identification information. If the label is a physical label, step 220 can import the label information into the digital process, such as using a scanner, using a user input, or by other means.

In a step 230, the label can be parsed using natural language processing into the components of the meta data. In a step 240, the meta data can be used to associate, e.g., match, the seismic data, associated with the meta data, to one or more CRS. This can generate a seismic data-CRS match information. In some aspects, the seismic data-CRS match can include ranks, weights, a primary CRS indicator, other statistical algorithms, or a combination thereof. In this aspect, the additional statistical information can be used to assist in identifying the CRS that should be utilized. In a step 245, a CRS model can be updated with the seismic data-CRS match information. In some aspects, one or more of step 220, step 230, step 240, and step 245 can be part of a machine learning system. Method 200 can return to step 210 if additional seismic data is received. Alternatively, method 200 can proceed to a step 295.

In step 260, the seismic data can be processed similar to step 220 and step 230 to determine its meta data. The meta data can be used as inputs to the CRS model. In a step 265, the process, using the CRS model, can provide one or more CRS as recommendations to match with the seismic data.

In a step 270, the seismic data-CRS match recommendations can be reviewed. In some aspects, the review can be completed automatically, such as using a machine learning system, or an operational system. In some aspects, the review can be completed by a user using a user system interacting with the processes. In a decision step 280, if the seismic data-CRS match is accepted, method 200 proceeds to step 285. If the seismic data-CRS match is not accepted, then a user can update the seismic data-CRS match and method 200 proceeds to step 240 where the CRS model is updated. In some aspects, one or more of step 260, step 265, step 270, or step 280 can be part of a machine learning system.

In step 285, the seismic data-CRS match is communicated to another system, for example, a reservoir operation system, a borehole operation system, a database, a data store, a cloud environment, a data center, a server, or other types of computing systems. Proceeding to step 295, method 200 ends at step 295.

Figure 3:
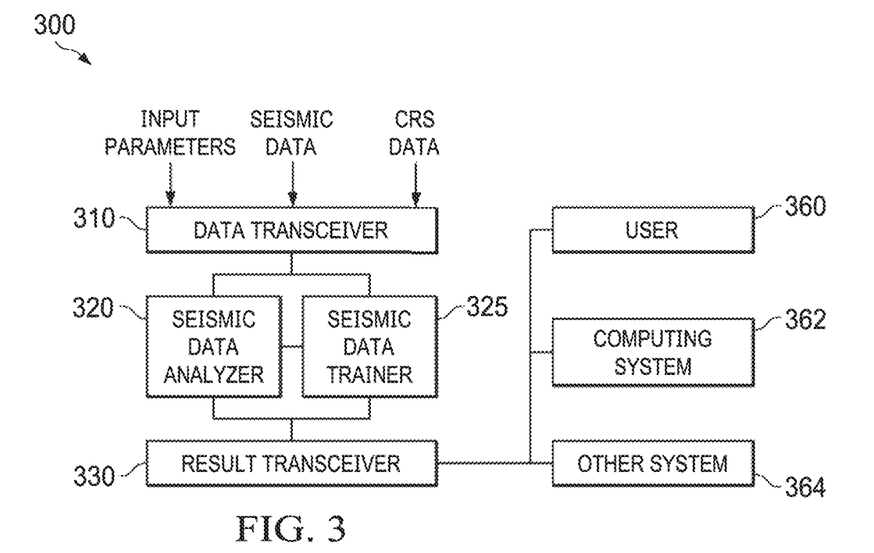
FIG. 3 is an illustration of a block diagram of an example seismic data analyzer system.

FIG. 3 is an illustration of a block diagram of an example seismic data analyzer system 300, which can be implemented in one or more computing systems, for example, a data center, cloud environment, server, laptop, smartphone, tablet, and other computing systems. In some aspects, seismic data analyzer system 300 can be implemented using a seismic data analyzer controller such as seismic data analyzer controller 400 of FIG. 4. Seismic data analyzer system 300 can implement one or more methods of this disclosure, such as method 200 of FIG. 2.

Seismic data analyzer system 300, or a portion thereof, can be implemented as an application, a code library, a dynamic link library, a function, a module, other software implementation, or combinations thereof. In some aspects, seismic data analyzer system 300 can be implemented in hardware, such as a ROM, a graphics processing unit, or other hardware implementation. In some aspects, seismic data analyzer system 300 can be implemented partially as a software application and partially as a hardware implementation. Seismic data analyzer system 300 is a functional view of the disclosed processes and an implementation can combine or separate the described functions in one or more software or hardware systems.

Seismic data analyzer system 300 includes a data transceiver 310, a seismic data analyzer 320, a seismic data trainer 325, and a result transceiver 330. The generated results, e.g., the seismic data-CRS match and recommendations, and interim outputs from seismic data analyzer 320 or seismic data trainer 325 can be communicated to a data receiver, such as one or more of a user or user system 360, a computing system 362, or other processing or storage systems 364. The generated results can be used to determine the seismic data-CRS match to be used by other systems, such as a seismic interpretation workflow.

Data transceiver 310 can receive input parameters, such as parameters to direct the operation of the analysis implemented by seismic data analyzer 320 or seismic data trainer 325. In some aspects, data transceiver 310 can be part of seismic data analyzer 320 or seismic data trainer 325.

Result transceiver 330 can communicate one or more generated results, interim outputs, or seismic data-CRS match recommendations, to one or more data receivers, such as user or user system 360, computing system 362, storage system 364, e.g., a data store or database, or other related systems, whether located proximate result transceiver 330 or distant from result transceiver 330. Data transceiver 310, seismic data analyzer 320, seismic data trainer 325, and result transceiver 330 can be, or can include, conventional interfaces configured for transmitting and receiving data. In some aspects, seismic data analyzer 320 can be a machine learning system. In some aspects, seismic data trainer 325 can be a machine learning system. In some aspects, seismic data trainer 325, and one or more of data transceiver 310, seismic data analyzer 320, or result transceiver 330 can be part of the machine learning system.

Seismic data analyzer 320 can implement the analysis and algorithms as described herein utilizing the seismic data, the input parameters, and the CRS model. For example, seismic data analyzer 320 can perform the recommendation process where a seismic data-CRS match is generated for recommendation, and the accepted recommendation is communicated to another system or process. A memory or data storage of seismic data analyzer 320 can be configured to store the processes and algorithms for directing the operation of seismic data analyzer 320. Seismic data analyzer 320 can also include a processor, such as processor 430 of FIG. 4, that is configured to operate according to the analysis operations and algorithms disclosed herein, and an interface to communicate (transmit and receive) data.

Seismic data trainer 325 can implement the analysis and algorithms as described herein utilizing the seismic data and the input parameters. For example, seismic data trainer 325 can perform the learning phase as described herein to match seismic data to one or more CRS. A memory or data storage of seismic data trainer 325 can be configured to store the processes and algorithms for directing the operation of seismic data trainer 325. Seismic data trainer 325 can also include a processor, such as processor 430 of FIG. 4, that is configured to operate according to the analysis operations and algorithms disclosed herein, and an interface to communicate (transmit and receive) data.

Figure 4:
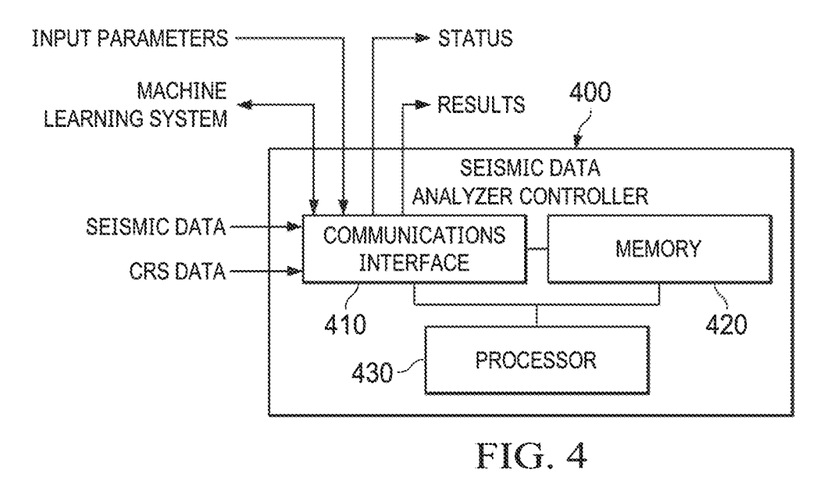
FIG. 4 is an illustration of a block diagram of an example seismic data analyzer controller according to the principles of the disclosure.

FIG. 4 is an illustration of a block diagram of an example of seismic data analyzer controller 400 according to the principles of the disclosure. Seismic data analyzer controller 400 can be stored on a single computer or on multiple computers. The various components of seismic data analyzer controller 400 can communicate via wireless or wired conventional connections. A portion or a whole of seismic data analyzer controller 400 can be located at one or more locations and other portions of seismic data analyzer controller 400 can be located on a computing device or devices located downhole or at a surface location. In some aspects, seismic data analyzer controller 400 can be wholly located at a surface or distant location. In some aspects, seismic data analyzer controller 400 can be part of another system, and can be integrated in a single device, such as a part of down hole tools.

Seismic data analyzer controller 400 can be configured to perform the various functions disclosed herein including receiving input parameters and seismic data, and generating results from an execution of the methods and processes described herein, such as seismic data-CRS match information. Seismic data analyzer controller 400 includes a communications interface 410, a memory 420, and a processor 430.

Communications interface 410 is configured to transmit and receive data. For example, communications interface 410 can receive the input parameters and the seismic data. Communications interface 410 can transmit the generated results, data from the input files, the seismic data, seismic data-CRS match, or interim outputs. In some aspects, communications interface 410 can transmit a status, such as a success or failure indicator of seismic data analyzer controller 400 regarding receiving the various inputs, transmitting the generated results, or producing the generated results.

In some aspects, communications interface 410 can receive input parameters from a machine learning system, such as a CRS model, for example, where the meta data for the seismic data is communicated to the machine learning system and the machine learning system communicates the seismic data-CRS match, such as is described for seismic data analyzer 320. In some aspects, the machine learning system can receive the meta data for the seismic data and a user input indicating a CRS such as when a training or learning operation is taking place, such as is described for seismic data trainer 325.

In some aspects, the machine learning system can be implemented by processor 430 and perform the operations as described by seismic data analyzer 320 or seismic data trainer 325. In some aspects, processor 430 can implement a process such as a computer program product having a series of operating instructions stored on a non-transitory computer-readable medium that directs a data processing apparatus when executed thereby to perform operations to generate a seismic data-CRS match, the operations can include (1) receiving seismic data relating to a location of interest, (2) parsing meta data of the seismic data to determine a name, an area, or a code, and (3) utilizing a CRS model of the seismic data analyzer to associate the seismic data with one or more CRS to generate a seismic data-CRS match, wherein the seismic data-CRS match is utilized to determine a first location of a reservoir field or a second location of a borehole for hydrocarbon production.

Communications interface 410 can communicate via communication systems used in the industry. For example, wireless or wired protocols can be used. Communication interface 410 is capable of performing the operations as described for data transceiver 310 and result transceiver 330 of FIG. 3.

Memory 420 can be configured to store a series of operating instructions that direct the operation of processor 430 when initiated, including the code representing the algorithms for determining processing the collected data. Memory 420 is a non-transitory computer readable medium. Multiple types of memory can be used for data storage and memory 420 can be distributed.

Processor 430 can be configured to produce the generated results (e.g., seismic data-CRS match, or updated CRS model), one or more interim outputs, statuses utilizing the received inputs. For example, processor 430 can apply the CRS model to seismic data to generate the seismic data-CRS match. Processor 430 can be configured to direct the operation of the seismic data analyzer controller 400. Processor 430 includes the logic to communicate with communications interface 410 and memory 420, and perform the functions described herein. Processor 430 is capable of performing or directing the operations as described by seismic data analyzer 320 or seismic data trainer 325 of FIG. 3.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the SUMMARY section can have one or more of the following additional elements in combination. Element 1: wherein the parsing utilizes a natural language processing system. Element 2: wherein the associating utilizes a rank or a weight for each CRS in the one or more CRS. Element 3: wherein the name, the area, or the code is a file name or a label. Element 4: wherein the updating utilizes a user input to update the CRS model. Element 5: further including communicating the seismic data-CRS match to one or more borehole operation systems. Element 6: wherein there is more than one CRS in the one or more CRS, and the seismic data-CRS match includes an indicator for a primary CRS. Element 7: wherein there is more than one CRS in the one or more CRS, and the seismic data-CRS match includes a rank or a weight for each CRS in the one or more CRS. Element 8: wherein there is more than one CRS, and the seismic data-CRS match is communicated to a user system, where, using the user system, a user selects a primary CRS from the one or more CRS. Element 9: wherein an output from the user system is utilized to update the CRS model. Element 10: wherein the user system utilizes a statistical infographic to interpret the seismic data-CRS match. Element 11: wherein the user system utilizes a GIS system. Element 12: wherein the CRS model utilizes a statistics-based CRS recommendation. Element 13: further comprising a result transceiver, capable of communicating results, interim outputs, and the seismic data-CRS match to a user system, a data store, or a computing system. Element 14: wherein the computing system is a borehole operation system. Element 15: wherein an output from the user system is used to update the CRS model. Element 16: wherein the label is one or more of a name, an area, or a code. Element 17: wherein the seismic data analyzer is further capable of using ranks, weights, or statistical algorithms to select the one or more CRS recommendations.

What is claimed is:

1. A method to train a machine learning system to associate seismic data with cartographic reference systems, comprising:
   receiving seismic data from a national data repository or a data storage, relating to a location of interest;
   parsing meta data of the seismic data to determine a name, an area, or a code;
   associating the seismic data with two or more cartographic reference systems (CRSs), using the meta data, to generate a seismic data-CRS match, wherein the seismic data-CRS match is communicated to a user system and a user selects a primary CRS from the two or more CRSs; and
   training the machine learning system by updating a CRS model with the seismic data-CRS match, wherein the seismic data-CRS match is utilized to determine a first location of a reservoir field and a second location of a borehole for hydrocarbon production, and the seismic data-CRS match includes an indicator for a selected CRS from the two or more CRSs, where the borehole is placed at the second location in the reservoir field using the seismic data-CRS match.

2. The method as recited in claim 1, wherein the parsing utilizes a natural language processing system.

3. The method as recited in claim 1, wherein the associating utilizes a rank or a weight for each CRS in the one or more CRS.

4. The method as recited in claim 1, wherein the name, the area, or the code is a file name or a label.

5. The method as recited in claim 1, wherein the updating utilizes a user input to update the CRS model.

6. A method of using a machine learning system for matching seismic data to cartographic reference systems, comprising:
   receiving seismic data, from a data storage, relating to a location of interest;
   parsing meta data of the seismic data to determine a name, an area, or a code; and
   utilizing a cartographic reference system (CRS) model to associate the seismic data with two or more CRS, utilizing the meta data, to generate a seismic data-CRS match that includes an indicator for a primary CRS, wherein the indicator for a primary CRS is determined by a user after the seismic data-CRS match is communicated to a user system, wherein the seismic data-CRS match is utilized to determine a first location of a reservoir field and a second location of a borehole for hydrocarbon production, where the borehole is placed at the second location in the reservoir field using the seismic data-CRS match.

7. The method as recited in claim 6, further comprising:
   communicating the seismic data-CRS match to one or more borehole operation systems.

8. The method as recited in claim 6, wherein a seismic data analyzer selects one or more CRS recommendations from the seismic data-CRS.

9. The method as recited in claim 6, wherein there is more than one CRS in the one or more CRS, and the seismic data-CRS match includes a rank or a weight for each CRS in the one or more CRS.

10. The method as recited in claim 6, wherein the data storage is a national data repository.

11. The method as recited in claim 6, wherein an output from the user system is utilized to update the CRS model.

12. The method as recited in claim 6, wherein the user system utilizes a statistical infographic to interpret the seismic data-CRS match.

13. The method as recited in claim 6, wherein the user system utilizes a geographic information system (GIS) system.

14. The method as recited in claim 6, wherein the CRS model utilizes a statistics-based CRS recommendation.

15. A system, comprising:
   a data transceiver, capable of receiving seismic data, from a national data repository or a data storage, wherein the seismic data relates to a location of interest for a reservoir field and a location of interest for a borehole;
   a machine learning system, capable of parsing meta data of the seismic data to generate a label, associating, using the label, seismic data to at least two cartographic reference systems (CRSs) to generate a seismic data-CRS match, wherein the seismic data-CRS match includes an indicator for a primary CRS, and updating a CRS model using the seismic data-CRS match, where the seismic data-CRS match is communicated to a user system and a user selects the primary CRS from the at least two CRSs; and
   a seismic data analyzer, capable of communicating with the data transceiver and the machine learning system, and using the CRS model to select one or more CRS recommendations for the seismic data, where the borehole is placed at the location of interest for the borehole in the reservoir field using the seismic data-CRS match.

16. The system as recited in claim 15, further comprising:
a result transceiver, capable of communicating results, interim outputs, and the seismic data-CRS match to a user system, a data store, or a computing system.

17. The system as recited in claim 16, wherein the computing system is a borehole operation system.

18. The system as recited in claim 16, wherein an output from the user system is used to update the CRS model.

19. The system as recited in claim 15, wherein the label is one or more of a name, an area, or a code.

20. The system as recited in claim 15, wherein the seismic data analyzer is further capable of using ranks, weights, or statistical algorithms to select the one or more CRS recommendations.

* * * * *